Nov. 23, 1943.   L. D. SMITH   2,335,199
SCRAPER FOR SHIP UNLOADING APPARATUS
Original Filed July 10, 1940   2 Sheets-Sheet 1
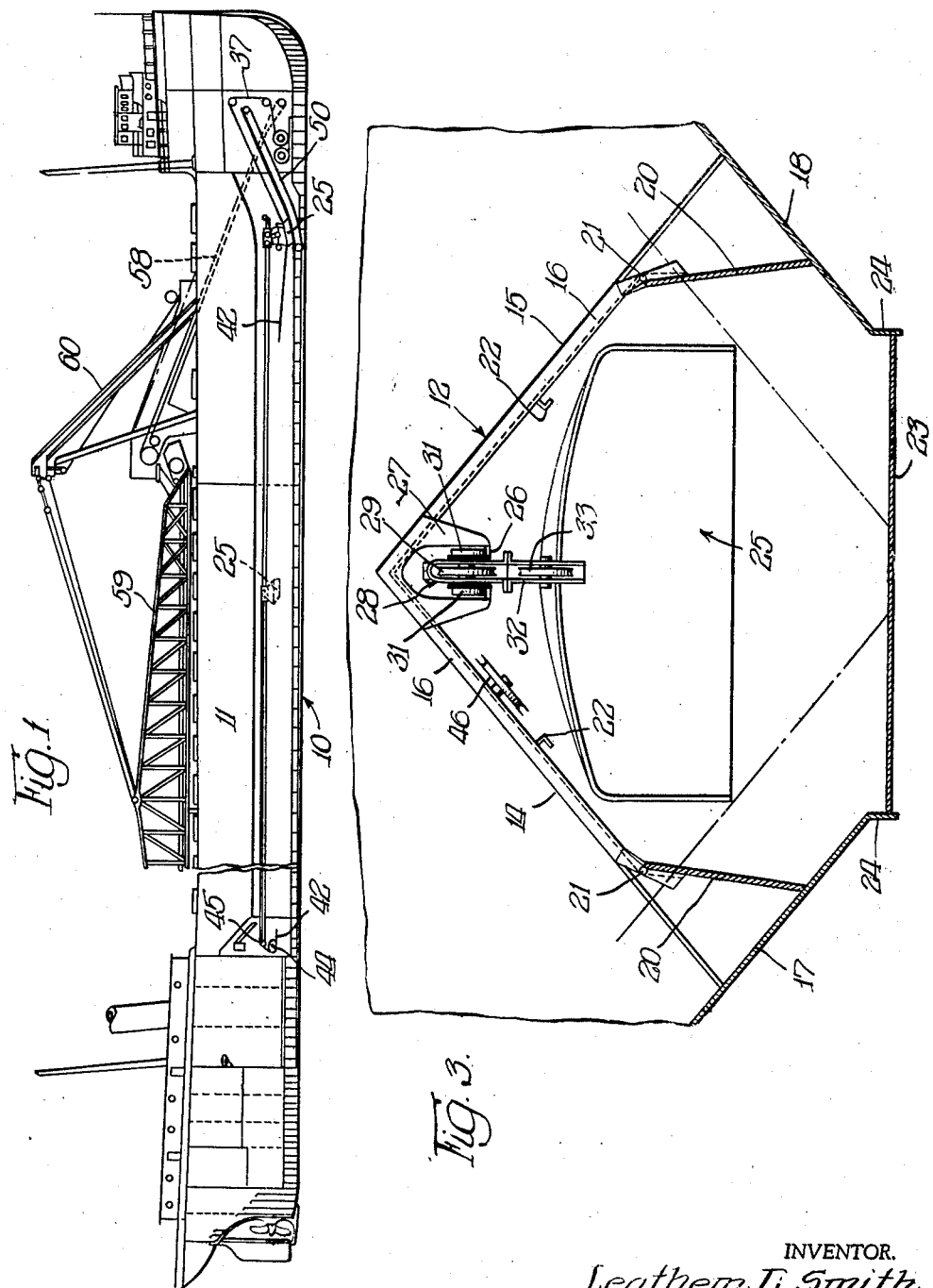
INVENTOR.
Leathem D. Smith,
BY Nov. 23, 1943.   L. D. SMITH   2,335,199
SCRAPER FOR SHIP UNLOADING APPARATUS
Original Filed July 10, 1940   2 Sheets-Sheet 2
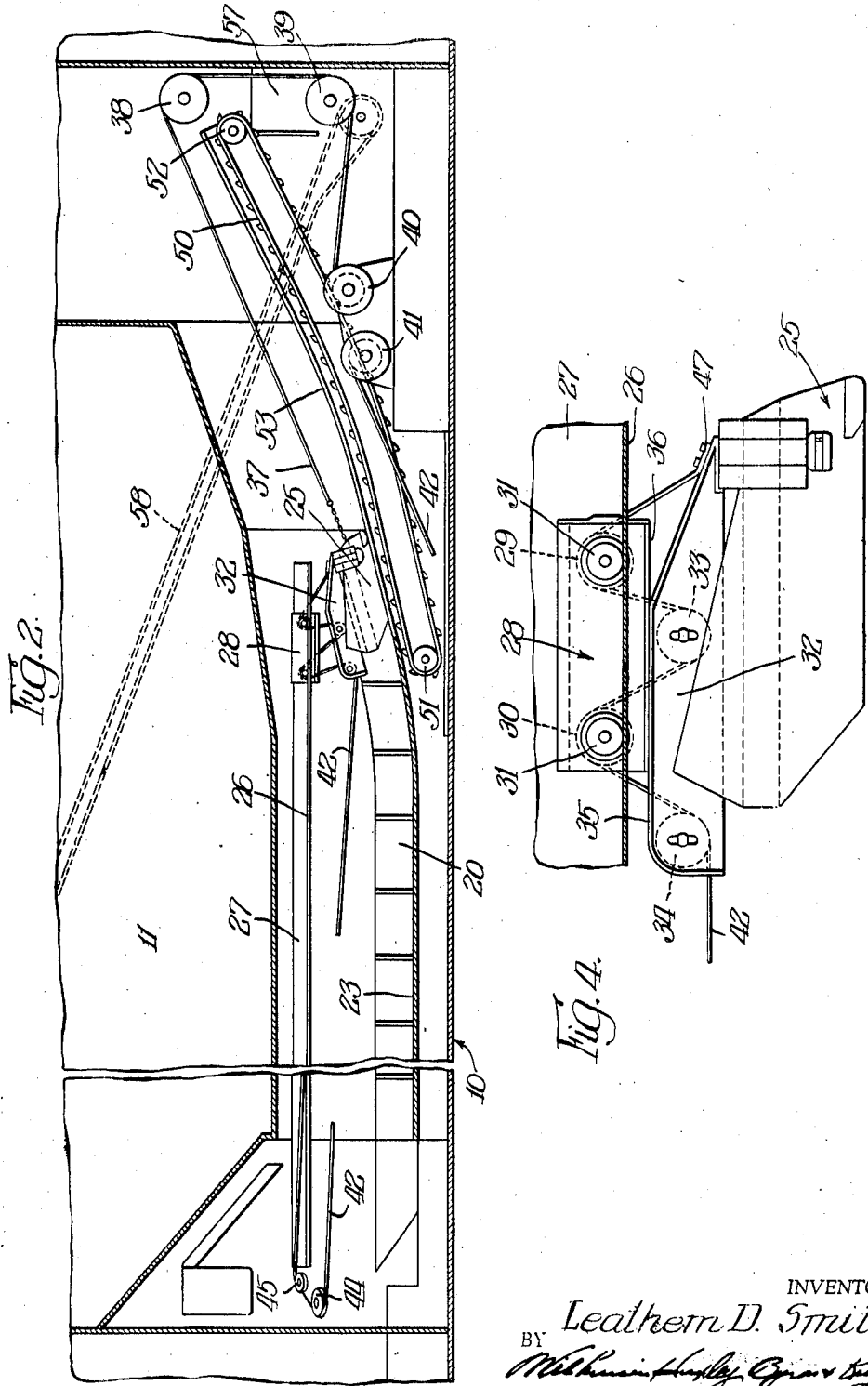
INVENTOR.
Leathem D. Smith,
BY Patented Nov. 23, 1943

2,335,199

UNITED STATES PATENT OFFICE 2,335,199

SCRAPER FOR SHIP UNLOADING APPARATUS

Leathem D. Smith, Sturgeon Bay, Wis.

Original application July 10, 1940, Serial No. 344,637. Divided and this application December 4, 1941, Serial No. 421,567

2 Claims. (Cl. 214—15)

The invention relates to a bulk cargo unloading system for vessels and has reference more particularly to a scraper and improved trolley and support therefor whereby the scraper may be reciprocated within a tunnel in the hold of the vessel for removing the material therefrom. This application is a division of my parent case Serial No. 344,637 filed July 10, 1940, and entitled Unloading system for bulk vessels.

In unloading apparatus of the type shown in the present drawings the cargo vessel is provided with one or more tunnels which extend longitudinally within the hold of the vessel and have associated therewith angularly disposed lateral bottom members for directing the material through open doors in the side walls of the tunnel. It is possible to control admission of the material to the tunnel by selectively opening the doors whereby the material will flow within the tunnel and is thus brought within reach of a conveyor in the form of a scraper having reciprocating movements from end to end of the tunnel.

In the operation of removing the material from the tunnel to an endless belt conveyor for discharging the cargo to one side of the vessel the scraper is caused to travel the length of the tunnel and in its forward movement the scraper will dig into the material and propel a portion thereof forwardly to a point of discharge. The improvement comprising the present invention resides in a trolley and trolley support for the scraper which will automatically lift the scraper and hold the same elevated in contact with the trolley support during return movement. This avoids breakage of the material and in addition considerably speeds up travel of the scraper in a rearward direction. It is also possible with this design of trolley and track to locate the back-haul cable in the tunnel so as to reduce cable friction and make the space below side and center slopes available for water ballast.

With these and other objects in view the invention may consist of certain novel features of construction and operation as will be more fully described and particularly pointed out in the specification, drawings and claims appended hereto.

In the drawings which illustrate an embodiment of the invention and wherein like reference characters are used to designate like parts—

Figure 1 is an elevational view of a cargo vessel, partly in central longitudinal section, embodying the improved structure of scraper and trolley support comprising the invention;

Figure 2 is an enlarged fragmentary sectional view showing the respective ends of the tunnel and illustrating the present scraper and trolley for supporting the same;

Figure 3 is a detail view showing in front elevation a scraper located within its tunnel and which is supported above the material by the improved trolley and track of the invention; and Figure 4 is a fragmentary elevational view showing the trolley support for the scraper whereby the same is automatically lifted and held in elevated position during return travel.

Referring to the drawings, the numeral 10 indicates the hull of a vessel having a cargo space 11 extending for a portion of its length as may be available in cargo vessels of this type. In the hold 11 are located conveyor tunnels, one of which is shown in Figure 3 and identified in its entirety by numeral 12. The tunnel is formed by oppositely inclined roof members 14 and 15 forming an apex at their upper ends and which roof members may be reinforced at spaced points by angle members 16. The angular roof members direct the material to the respective sides of the tunnel from which the inclined bottom members of the vessel direct the material to within the tunnel.

As shown in Figure 3, the inclined lateral members 17 and 18 comprise the bottom members of the hold and since these members slope toward the tunnel on the respective sides thereof they function to direct the material into the tunnel through openings which may be closed by doors 20. When said doors are opened by swinging the same inwardly on their pivots 21 the material enters the tunnel and assumes an angle of repose substantially parallel with the bottom members 17 and 18 and somewhat below the scraper when in elevated position.

In the present construction of tunnel the exterior surfaces have all obstructions removed therefrom such as would prevent the free flow of the cargo from the hold of the vessel to within the tunnel. Accordingly, the angle members 16 are disposed parallel with the flow of the material and if any angle brackets for stiffening and reinforcing the bottom members 17 and 18 are employed the same may be located underneath their respective members. The doors 20 are held in open position by interior brackets 22. The floor of the tunnel is formed by a substantially flat member 23 which extends for the full length thereof and for the full width of the tunnel, having contact along its respective sides with depending flanges 24 extending downwardly from the bottom members 17 and 18.

The scraper 25 within the tunnel is suitably supported for movement by the trolley and track, as shown in Figures 3 and 4. Overhead spaced track portions 26 are provided by the depending members 27 and said track portions in turn support the trolley 28, journalling at its ends pulleys 29 and 30, respectively, which pulleys are positioned centrally within the trolley. The said trolley also journals on the same axles the track wheels 31 having rolling contact with the track portions 26, whereby the trolley has rolling movement along the length of said track portions. The scraper 25 has a central upstanding member 32 running the full length of the scraper and extending for a slight distance beyond the same, as will be clearly understood by referring to Figure 4. The upstanding member 32 journals pulleys 33 and 34 and the upper surface 35 of said member is flat for contact with the lower flat surface 36 of the trolley. When the flat surfaces are in contact the scraper is in elevated position, which position is assumed when the scraper and trolley are travelling rearwardly of the tunnel.

The forward movement of the scraper is accomplished by a forward cable 37, Figure 2, having connection with the forward end of the scraper. This forward cable passes over a sheave 38 and then under a sheave 39 to the winding drum 40 on which said cable may be wound. A similar winding drum 41 is provided for the back-haul cable 42. This cable passes over several sheaves, not shown, so as to enter the tunnel 12 and then extends rearwardly of the tunnel for coaction with sheaves 44 and 45. Also in the rearward travel of the cable 42 frictional resistance to movement of the same can be eliminated by locating within the tunnel adjacent the upper sloping wall thereof a plurality of sheaves 46 having spaced relation with respect to each other. At the rear end of the tunnel the back-haul cable 42 is reversed and this rear loop extends forwardly for connection with the scraper. Said cable is fastened to the scraper at 47, which is toward the front end of the scraper but immediately preceding this connection the cable has contact respectively with the pulleys journalled by the trolley and also the pulleys journalled by member 32 of the scraper. Rearwardly from the dead end connection for cable 42 the same passes over pulley 29, Figure 4, of the trolley and then under pulley 33 carried by the scraper, then over pulley 30 of the trolley and finally under pulley 34 of the scraper. As a result the scraper is carried by the trolley through the back-haul cable 42 and it will be observed by reference to Figures 2 and 4 that when this back-haul cable is loose the scraper will rest on the bottom of the tunnel but when the said cable is taut the effect is to lift the scraper into an elevated position so that the flat surface 35 of member 32 is in contact with the lower flat surface 36 of the trolley.

Forward movement of the scraper takes place when drum 40 is rotated to wind up the forward cable 37. Simultaneously therewith drum 41 is unwound so as to play out the back-haul cable 42, providing slack in the same so that the scraper may be pulled along the bottom of the tunnel. For rearward movement of the scraper cable 42 is wound on drum 41 and drum 40 is rotated to play out the forward cable 37. When the back-haul cable becomes taut the initial result is to elevate the rear of the scraper since the slack between pulleys 34 and 30 will be taken up. This initial action of the scraper is important in unloading apparatus of the present type since the material within the scraper is automatically dumped at its point of discharge, which is the farthest point of travel forwardly of the scraper. Backward travel of the scraper along with this initial elevation of the rear end also facilitates removal of any material left within the scraper. As tension in the cable 42 increases slack between pulleys 30 and 33 is taken up and then slack between pulleys 33 and 29. Eventually the scraper is in full elevated position where flat surface 35 is in contact with the flat surface 36, whereupon rearward travel of the scraper continues until the desired rear point in the tunnel is reached.

Continuous discharge mechanism is provided at the forward end of the tunnel for taking the load from the scraper. The structure shown in Figure 2 essentially consists of an apron feeder 50 located under the tunnel floor at its forward end and which has continuous movement during the operation of unloading the vessel. The apron feeder may be of any well known construction, the same consisting of a plurality of articulated buckets forming an endless belt which is supported at the left end by a conventional drum 51 and at the right hand end by a similar drum 52. Any suitable means may be provided for imparting movement to the apron conveyor 50, the material from the tunnel being supplied thereto intermittently by scraper 25 and which material is discharged to the apron conveyor through the longitudinal opening 53 in the floor of the tunnel. Said opening 53 has a width somewhat less than that of the apron feeder and the edges of the opening may be flanged downwardly in order that the material will be properly directed.

It will be observed that the drum 52 supporting the forward end of the apron feeder is elevated somewhat with respect to drum 51 and the material discharged from this elevated end is received by a transverse chute 57 which in turn delivers the material to a centrally located belt conveyor 58, the same removing the material from all the tunnels within the hold of the ship and delivering the same to the deck of the vessel. From the belt conveyor 58 the material is discharged in any conventional manner to the side of the vessel as by means of a boom conveyor 59 suitably supported for swinging movement by the A-frame 60. With the present type of unloading apparatus the center of gravity of the loaded vessel is very low, which accordingly permits the installation of a relatively long boom conveyor. The continuously operating apron feeder 50 is designed to take care of the load of the scraper and also the overload, that is, the material pushed forwardly in front of the scraper.

The design of trolley and track permits the lifting of the scraper bodily from the floor and a higher return speed is therefore possible. The scraper travels rearwardly over the material in the tunnel and breakage of the material is practically eliminated.

The invention is not to be limited to or by details of construction of the particular embodiment thereof illustrated in the drawings, as various forms of the device will of course be apparent to those skilled in the art without departing from the spirit of the invention or the scope of the claims.

What is claimed is:

1. In unloading apparatus for removing bulk cargo from vessels and the like, the combination with a tunnel, of a scraper having reciprocating movements longitudinally within the tunnel from end to end thereof for removing the material from the tunnel to a forward point of discharge, overhead spaced track members depending from the roof of the tunnel and extending longitudinally of the same, a trolley having track wheels for rolling movement on said spaced track members and said trolley including a depending contact member provided with a substantially flat lower surface, pulleys journalled by said trolley at the respective ends thereof, a central member extending upwardly and longitudinally of the scraper and having a substantially flat upper surface, said member also journalling pulleys at the respective ends thereof, and flexible cable means for imparting rearward movement to the scraper, said flexible cable means contacting alternately the pulleys journalled by the central member and the pulleys journalled by the trolley in advance of its connection to the scraper at the forward end thereof, whereby the scraper is connected to the trolley by said cable means and is automatically elevated when said cable means becomes taut to cause the flat upper surface of the central member to contact the flat lower surface of the trolley.

2. In unloading apparatus for removing bulk cargo from vessels and the like, the combination with a tunnel, of a scraper having reciprocating movements longitudinally within the tunnel from end to end thereof for removing the material from the tunnel to a forward point of discharge, an overhead track member depending from the roof of the tunnel and extending longitudinally of the same, a trolley having forward and rearward track wheels for rolling movement on the track member, a pulley associated with each of the forward and rearward track wheels respectively and being journalled by said trolley, said scraper having a central upstanding member extending longitudinally thereof and also journalling a forward and a rearward pulley, flexible cable means having connection with the scraper for imparting forward movement thereto, and other flexible cable means for imparting rearward movement to the scraper, said other flexible cable means in advance of its connection with the scraper alternately passing under the pulleys on the central member and over the pulleys on the trolley, whereby the scraper is connected to the trolley by said other flexible cable means and which automatically operates to elevate the scraper when the said cable means becomes taut.

LEATHEM D. SMITH.